United States Patent [19]

King

[11] Patent Number: 4,736,524
[45] Date of Patent: Apr. 12, 1988

[54] FRAMING T-SQUARE AND PROTRACTOR

[76] Inventor: Calvin E. King, 1832 Port La., Worden, Ill. 62097

[21] Appl. No.: 15,450

[22] Filed: Feb. 17, 1987

[51] Int. Cl.[4] .............................................. G01C 9/12
[52] U.S. Cl. ...................................... 33/451; 33/353; 33/469; 33/418
[58] Field of Search ................ 33/403, 468, 469, 470, 33/471, 423, 424, 415, 416, 417, 1 N, 1 D, 451

[56] References Cited

U.S. PATENT DOCUMENTS

| | | | |
|---|---|---|---|
| 591,964 | 10/1897 | Gilcrest | 33/468 |
| 981,867 | 1/1911 | McCormick | 33/423 |
| 1,381,808 | 6/1921 | Davis | 33/469 |
| 2,423,786 | 7/1947 | Morris | 33/468 |
| 2,768,448 | 10/1956 | Rineer | 33/170 |
| 2,918,962 | 12/1959 | Jones | 269/289 MR |
| 3,828,436 | 8/1974 | King | 33/353 X |

*Primary Examiner*—Harry N. Haroian
*Attorney, Agent, or Firm*—Robert R. Keegan

[57] ABSTRACT

There is disclosed a framing T-Square and protractor wherein the head of the T-Square and the elongated rule thereof are connected by means of a ballbearing allowing the rule portion to be free-swinging with respect to the head, which is in the form of a rectangular plate having a protractor scale thereon marked in degrees and auxiliary scales marked with inches of rise per 12 inches of run for common rafters and for hip and valley rafters. A rectangular panel is hingedly attached to the plate on a hinged line normally at right angles to the elongated rule; a friction locking mechanism permits the rule to be locked at any desired angle relative to the plate and panel. The rule, plate, and panel are marked on the back with rafter tables and other data including run lengths and protractor angle settings useful in roof framing and other construction or carpentry work. A vernier scale on the front of the panel facilitates setting of angle measurements to an accuracy of one-tenth of a degree.

17 Claims, 3 Drawing Sheets

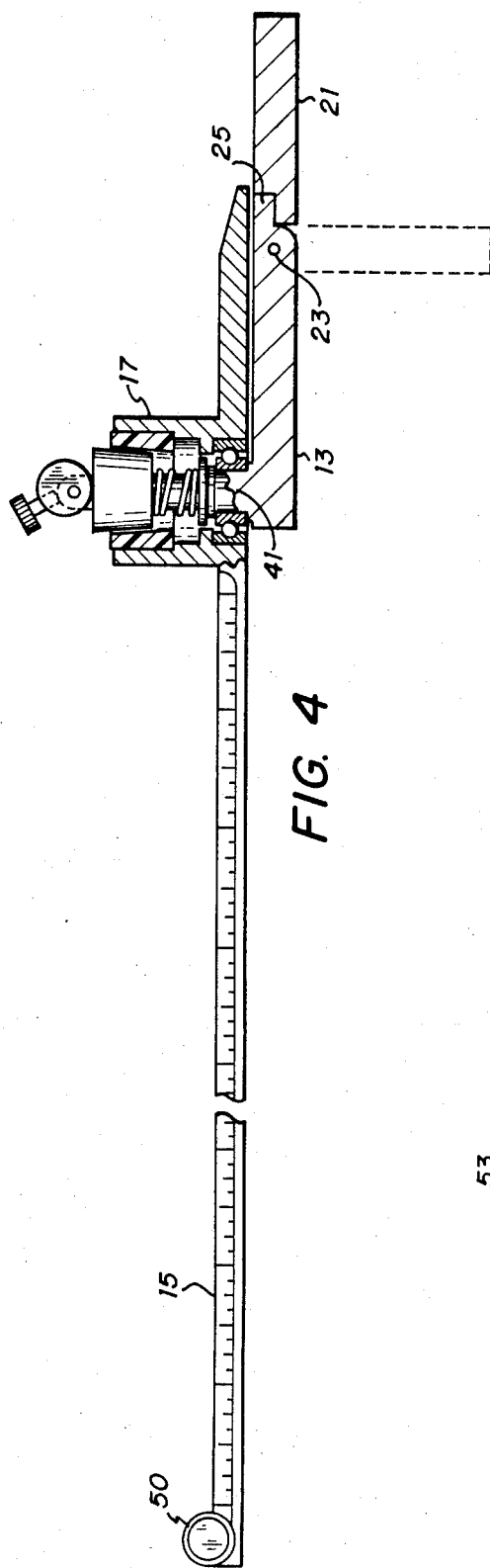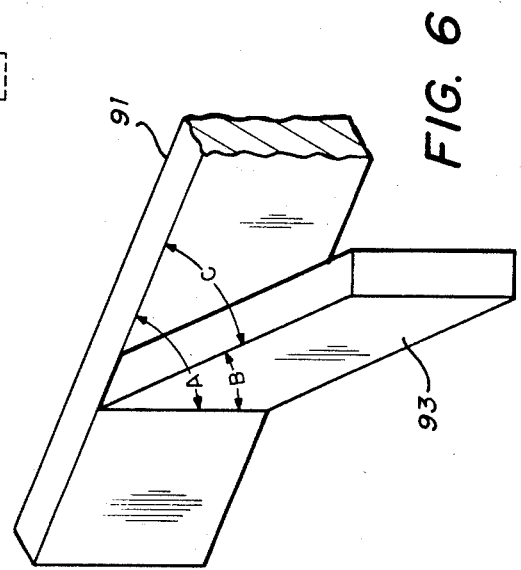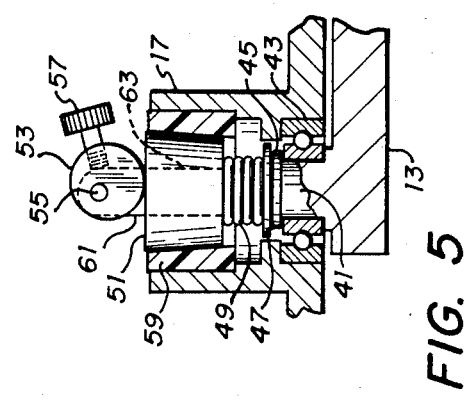

FRAMING T-SQUARE AND PROTRACTOR

The present invention relates to squares for use in construction work and particularly to framing squares including a protractor for angle measuring and scales particularly adapted to aid in roof framing. The apparatus disclosed represents a modification and improvement of the instrument disclosed in my U.S. Pat. No. 3,824,436 for "Swinging T-Square" granted Aug. 13, 1974.

While the general configuration of the Framing T-Square of the present invention is similar to that of my previous patent, the arrangement of the device and particularly the angle measuring scales provides far greater convenience and accuracy in use of the device in construction work and particularly for roof framing. A more convenient and reliable locking mechanism for the swinging rule portion of the present apparatus is provided. With the apparatus of the invention the angles required to be used in framing virtually any type of roof can very conveniently be set and locked in the apparatus allowing the wood framing members to be marked and cut with great speed and convenience.

As compared with the classic steel square used in construction work, the device of the present invention is much easier to use in commonly encountered situations. At the same time it is adaptable for use in virtually any phase of construction work requiring quick and accurate measurement of angles and marking of framing members for cutting.

The varied uses of the apparatus of the invention will be better understood from a brief description of roof framing principles where the apparatus of the invention is particularly useful.

While a mathematician might approach the construction of a roof by calculating various angles in degrees through the use of solid trigonometry, this is hardly practical for a carpenter, even a very proficient one. Carpentry procedures have been worked out using roof slopes expressed as inches of rise per 12 inches of run. Thus a roof with a rise of 4 inches for every 12 inches of run is termed a 4/12 pitch roof (or sometimes a ⅙ pitch). Other pitches are employed such as 5/12, 6/12, etc. The inches of rise are referred to 12 inches of run and fractional inches of rise are avoided.

Conventional roof construction generally proceeds from a point at which all of the walls of the structure are erected and the structural members for the ceiling called "ceiling joists" are in place. See *Constructing and Manufacturing Wood Products*, by Wayne H. Zook, published by McKnight Publishing Company of Bloomington, Ill., 1973, pages 405 to 409.

Layout of rafters is traditionally accomplished with a rafter square which is essentially a carpenters' framing square of 16×24 inches which commonly has a rafter table printed or embossed on it. The first line in the rafter table characteristically gives the length of the rafter for each foot of run for a roof of a prescribed pitch. For example, under 5 on the blade of the rafter square in the first line of the table is the number 13. For example, a building 24 feet wide would have a 12 foot run and 13 inches multiplied by 12 gives 13 feet which would be the length of a rafter from the roof peak to the plate. See *Roof Framing* by H. H. Siegele, Publ. by Drake Publishers, N.Y. 1974, Pages 115-122. In conventional construction rafters have notches with a "bird's mouth" which fits on top of the plate and facilitates nailing through the rafter into the plate. The rafter square is used to lay out the bird's mouth at the proper angle. Conventional roof construction also has a ridge board and the top end of the rafter needs to be angle cut with the aid of the rafter square for a proper fit against the ridge board (allowance for half the thickness of the ridge board must be made in determining the distance from the top of the rafter to the bird's mouth). Measurements on the rafter should be made on a line parallel to the edge of the rafter running through the apex of the bird's mouth angle notch. Often the rafter is left with a "tail" which provides an overhang for the roof. The rafter tail may be "plumb cut" at an angle also using the rafter square.

Obviously when a hip roof is involved additional complications arise in conventional roof construction. The hip rafters which run from the corner of the structure to the peak of the roof are longer than common rafters. This is commonly calculated by using a pitch triangle with the run figure being 17 instead of 12 (17 is very nearly the square root of two [1.414] times twelve and thus equal to the distance projected on a horizontal plane from the end of the roof peak to the corner of a twenty-four foot wide structure). The center rafter in the hip roof is normally caused to be of the same length and pitch as a common rafter, i.e. the slope of the hip portion of the roof is made the same as the gable portion by giving it a run equal to that of the gable portion. The other rafters in the hip are referred to as "jack rafters", and while they have the same pitch as common rafters they are shorter and also must be cheek cut on top to fit the hip rafter; that is, a compound angle is required in the top of the jack rafters in conventional construction. Tables printed on the rafter square aid the carpenter in making the rafters of the necessary length and cutting them at the proper angles. Considerable expertise in use of the rafter tables is required however. Gable roofs with valleys generally present the same situation since a valley rafter is essentially the same as a hip rafter except that it makes an acute angle with the roof peak whereas the hip rafters make an obtuse angle with the roof peak.

The framing T-Square according to the present invention is particularly useful in roof framing and has features whereby the angle of the rule relative to the T-plate may be directly set for a particular rafter rise to run for marking and cutting common rafters or hip and valley rafters. More complicated compound cuts can be marked with the framing T-Square of the invention by use of a protractor scale in degrees together with a vernier scale for setting the rule angle to the tenth of one degree.

Accurate setting of the rule is a particular advantage because an error of only one-half degree represents a displacement of one inch in a ten foot rafter run. As to those angle measurements which are not directly marked on the common rafter and hip and valley rafter scales, the required angle setting may be obtained from tables on the back of the rule and on the back of the T-plate or panel. The T-Square has a free-swinging mode which permits the T-plate to be held on or temporarily fastened to a rafter or other structural member to position the rafter at an angle relative to the horizontal as read on any of the scales of the instrument.

In addition to providing the above described features and advantages it is an object of the present invention to provide a framing T-Square and protractor having direct reading scales for common or hip and valley rafters for any normally used roof configurations or rise to run ratios.

It is another object of the present invention to provide a framing T-Square with a free-swinging elongated rule element that is lockable in position and wherein a vernier scale is provided on a protractor to permit the rule to the set or read with an accuracy of one-tenth of one degree.

It is yet another object of the present invention to provide a roof framing T-Square having a vernier protractor scale and tables giving the angle setting required for simple or compound cuts in roof framing or other carpentry work.

Other objects and advantages of the present invention will be apparent from consideration of the following description in conjunction with the appended drawings in which:

FIG. 4 is a partially sectional side-elevational view of the device of FIG. 1;

FIG. 5 is an enlarged detailed sectional view of the device of FIG. 1 in the locked position; and FIG. 6 is a diagram of conventional rafter construction presented to aid in the explanation of the invention.

Figure 1:
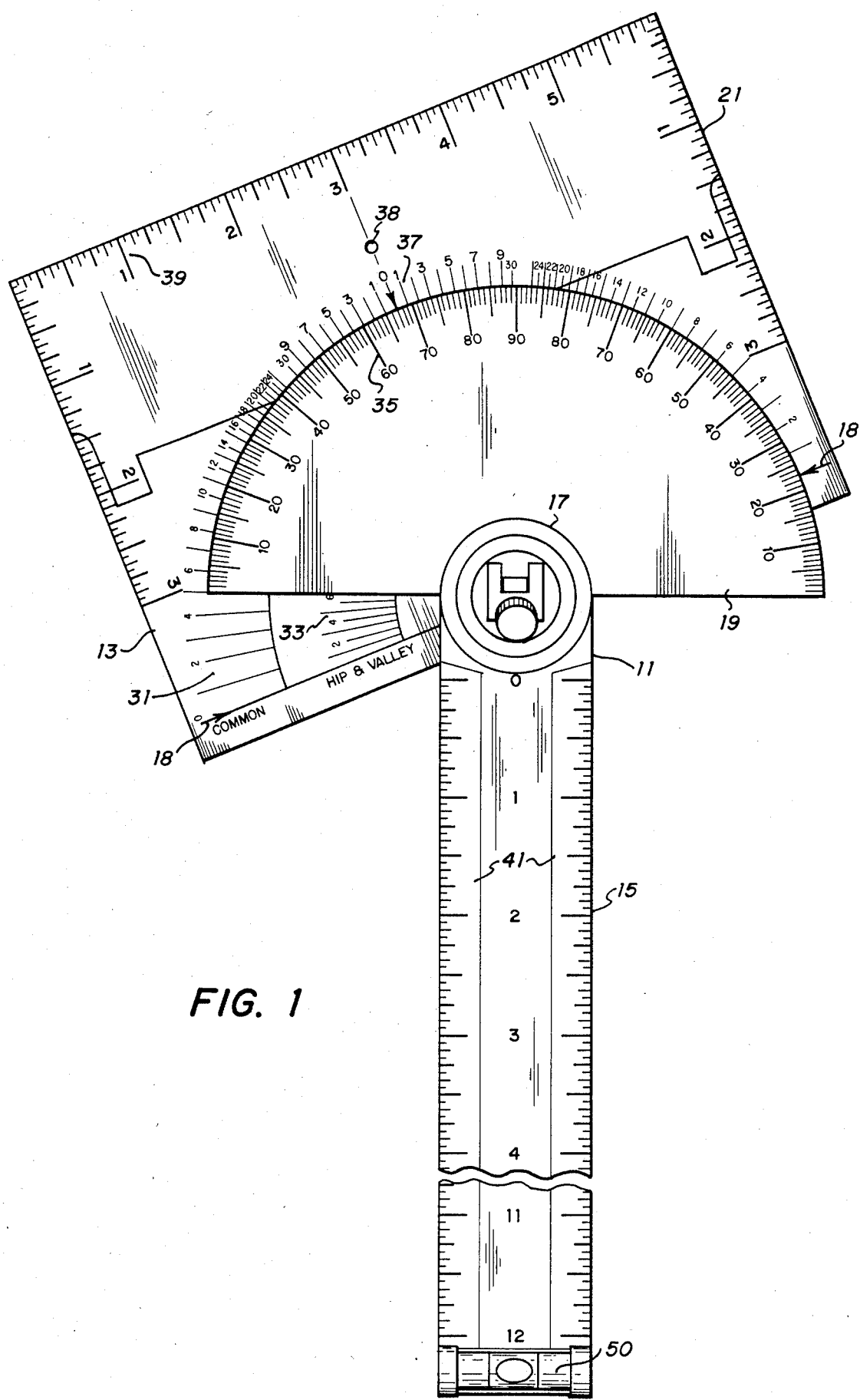
FIG. 1 is a top plan view of a framing T-Square and protractor according to the invention.

A framing T-Square is shown at 11 having a T-Plate 13 with an elongated rule 15 mounted thereon in a pivotal manner by means of hub 17. A semi-circular scale 19 is calibrated in degrees to form a protractor which reads against cursor marks 18 on plate 13.

A panel 21 is hingedly mounted to plate 13. A common rafter scale 31 is provided on plate 13 which is calibrated in inches of rise per foot of run. Preferably an additional scale 33, also calibrated in inches of rise per foot of run is provided for determining hip and valley rafter angles. See FIG. 6 which shows a hip rafter 91, a jack rafter 93, hip rafter angle A, common rafter angle B and jack rafter side cut angle C. Although two scales 31 and 33 are shown for illustration a lesser or greater number of such scales could be provided. For example, a jack side angle scale could be added as a third scale.

Use of the scales 31 and 33 is simple and straightforward. Suppose, for example, that a roof design calls for rafters with five inches of rise per foot of run. To mark a common rafter it is only necessary for the T-Square to set at 5 on the common rafter scale 31 thereby giving the proper angle as measured between plate 13 and rule 15 for marking the rafter for cutting. The hip and valley scale would be used for hip or valley rafters so that they would be marked with the proper angle. It should be noted that the odd numbered marks on scales 31 and 33 are unnumbered to avoid crowding of the calibrations. Inches of rise per run will seldom exceed 12 but scales 31 and 33 have marks for every inch to 25 inches and an additional mark at 30 inches.

Figure 2:
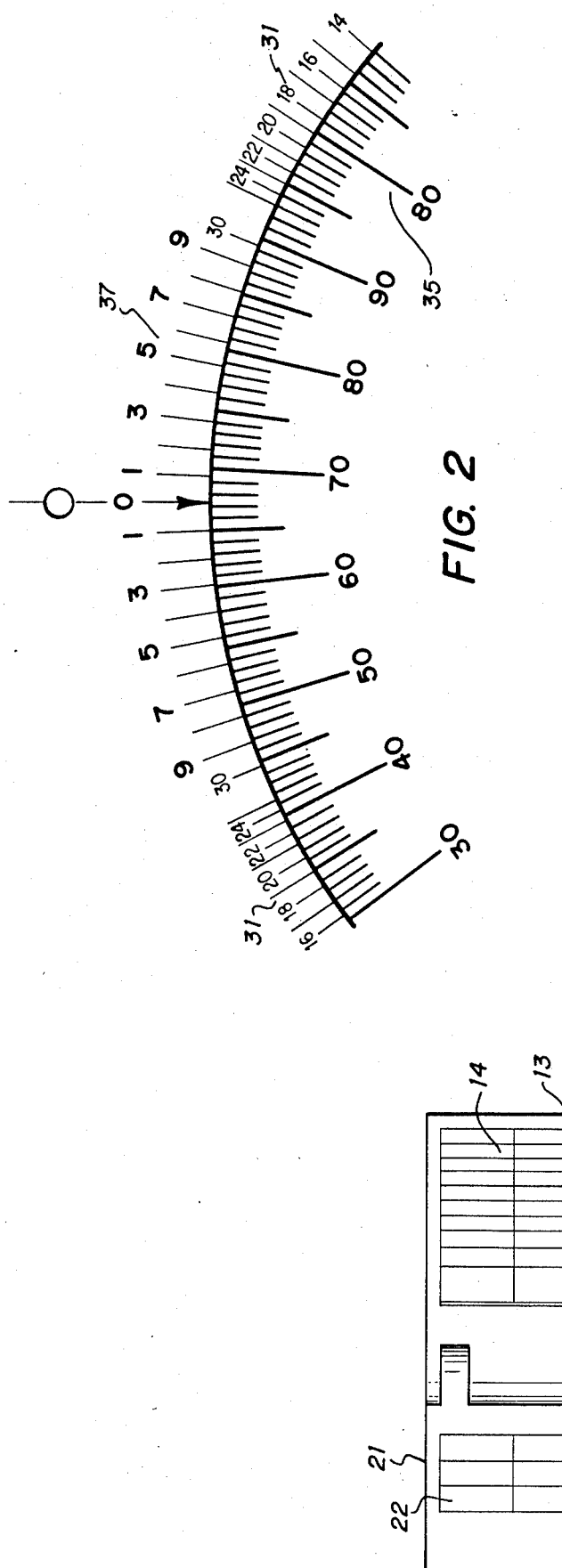
FIG. 2 is an enlarged view of the vernier scale of the protractor of FIG. 1.

A vernier scale 37 is imprinted or embossed on panel 21 which makes it readily possible to set the angle of rule 15 relative to plate 13 with an accuracy of one-tenth of one degree. An enlarged detailed view of vernier scale 37 is shown in FIG. 2.

Vernier scale 37 is used in conjunction with one of the cursor marks 18 and protractor scale 35 to set the angle of rule 15 with an accuracy of approximately one-tenth degree. For example, assume that the rule as shown in FIG. 1 is being set at 22.3 degrees, semi-circular scale 19 would be rotated slightly past the 22 degree mark as read against cursor mark 18 until the vernier scale 37 marker 3 to the right of center was aligned with a degree mark on protractor scale 35. It is not relevant which degree mark it is aligned against. This provides a setting of 23.3 degrees by virtue of the operation of the vernier scale.

The vernier scale 37 is generally conventional except that its marks are spaced apart by 2.1 degrees instead of by 1.1 degrees. This expands the vernier scale and makes it easier to read. It is also made easier to read by omitting the even numbers designating the tenths of a degree.

When measuring an angle by left hand cursor mark 18 against the left hand part of protractor scale 35 the left hand half of vernier scale 37 will also be used. Thus the vernier scale is usable virtually throughout the 180 degree range either to the right or to the left. Note that protractor scale 35 will read zero when rule 15 is at a right angle to the edge of T-plate 13 and reads the difference from such a right angle otherwise. Stated differently, when rule 15 is vertical scale 35 gives the angle relative to horizontal of the long edge of plate 13.

A conventional scale marked in inches and sixteenths or in another convenient manner is provided at 41. Preferably the center of hub 17 is spaced an integral number of inches from the folded down position of handle 21 and also an integral number of inches from the beginning of scale 41. This permits measurements to be made from the folded position of panel 21 on scale 41 by adding an integral number, 4 inches for example. Measurements could also be made to the edge of plate 13 when rule 15 is turned at 90 degrees by adding 4 inches, for example.

Figure 3:
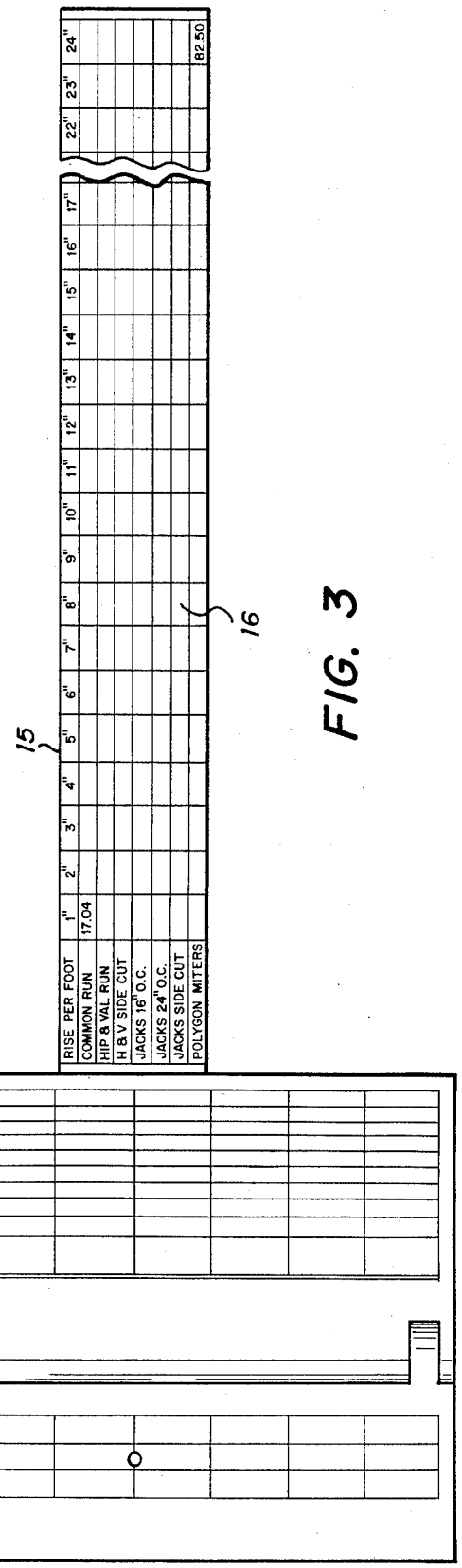
FIG. 3 is a bottom plan view of the device of FIG. 1.

As shown in FIG. 3, various tables are printed or embossed on the backs of rule 15, plate 13 and panel 21. A rafter table 16 is placed on the back of rule 15 with inch of rise calibrations from 1 to 24 extending the length of the rule 15. This data is shown in Table 1 below. In addition to rafter cutting data the table 16 includes angle data for polygon miters.

Although the nature and placement of data on the back of the T-Square is subject to variation it is preferred that table 14 on plate 13 includes decimal equivalents of common fractions and that table 22 on the back of panel 21 includes the length of common braces. Table 22 is set forth below as Table II. Decimal equivalents table 14 is not reproduced because it is commonly available from many sources.

Mechanical features of the T-Square 11 are best seen in FIGS. 4 and 5. Preferably panel 21 is hingedly attached to plate 13 by a pin 23 and a shoulder 25 on plate 13 restrains panel 21 so that it is free to move only between the horizontal position shown and the vertical position shown in dashed lines. Hole 38 allows panel 21 to be temporarily tacked to a rafter freeing both hands of the workman to adjust the rafter position or the T-Square. A conventional bubble level 50 is provided on rule 15 to permit rule 15 to be accurately positioned vertically.

As seen in FIG. 5 plate 13 is provided with an upstanding post 41 which has secured thereon a ballbearing 43 which provides an anti-friction bearing for relative rotation between hub 17 and plate 13. Bearing 43 may be held in place by a snap ring 45 with a conventional groove (not shown) in post 41 to accept snap ring 45. A washer 47 and a compression spring 49 are mounted on post 41, and an upper extension 61 of post 41 passes through an opening 63 in a conical plastic friction element 51. Extension 61 is preferably of square cross-section and is a snug slidable fit in hole 63 of similar shape.

A camming element 53 is rotatably mounted on extension 61 by means of pin 55 and is provided with a locking screw 57 mounted in a threaded opening in camming element 53. Plastic liner 59 secured in hub 17 by adhesive or otherwise has an opening conforming in shape to the frusto-conical shape of friction element 51. When camming element 53 and locking screw 57 are rotated to a counterclockwise position as shown in FIG. 4 compression spring 49 raises friction element 51 so that rule 15 rotates freely with respect to plate 13 by virtue of the low friction mounting provided by ball-bearing 43.

To lock rule 15 in position the camming element 53 and locking screw 57 are rotated firmly to the clockwise position illustrated in FIG. 5 and locking screw 57 may be turned to lock camming element 53 in position. This forces friction element 51 into plastic liner 59 which is sufficiently resilient to be forced against the sides of hub 17 and sandwiched between it and friction element 51. This fixes friction element 51 relative to hub 17 and it is likewise fixed relative to plate 13 by the engagement of square extension 61 in the square hole in friction element 51. Also cam 53 frictionally engages the top of friction element 51 causing it to be fixed relative to extension 61 and plate 13.

Release of the rule 15 for rotation is readily accomplished by loosening thumbscrew 57 and rotating cam element 53 counterclockwise so that spring 49 disengages friction element 51 out of liner 59.

From the foregoing description and explanation it will be seen that an adjustable and lockable T-Square is provided of great utility in carpentry or construction work and particularly in roof framing. It has the advantage that it can readily be set for framing a roof with a predetermined rise to run ratio without the necessity for referring to rafter tables. In addition the T-Square is a versatile tool for any framing or construction work requiring linear or angular measurement.

In addition to the variations and modifications to the device which have been described or suggested above, other variations and modifications will be apparent to those of ordinary skill in the art and accordingly the scope of the invention is not to be considered to be limited to the particular embodiments shown or variations suggested, but is rather to be determined by reference to the appended claims.

TABLE I

| RISE (inches) | COMMON RUN (inches) | HIP & VALLEY RUN (inches) | HIP & VALLEY SIDE CUT | JACK LENGTH 16" oc | JACK LENGTH 24" oc | JACK SIDE CUT | POLYGON MITERS |
| --- | --- | --- | --- | --- | --- | --- | --- |
| 1 | 12.04 | 17.00 | 45.05 | 16.06 | 24.08 | 45.10 | |
| 2 | 12.17 | 17.09 | 45.20 | 16.22 | 24.33 | 45.39 | |
| 3 | 12.37 | 17.23 | 45.44 | 16.49 | 24.74 | 45.87 | 30.00 |
| 4 | 12.65 | 17.44 | 45.77 | 16.87 | 25.30 | 46.51 | 45.00 |
| 5 | 13.00 | 17.69 | 46.19 | 17.33 | 26.00 | 47.29 | 54.00 |
| 6 | 13.42 | 18.00 | 46.69 | 17.89 | 26.83 | 48.19 | 60.00 |
| 7 | 13.89 | 18.36 | 47.25 | 18.52 | 27.79 | 49.18 | 64.29 |
| 8 | 14.42 | 18.76 | 47.87 | 19.23 | 28.84 | 50.24 | 67.50 |
| 9 | 15.00 | 19.21 | 48.54 | 20.00 | 30.00 | 51.34 | 70.00 |
| 10 | 15.62 | 19.70 | 49.25 | 20.83 | 31.24 | 52.47 | 72.00 |
| 11 | 16.28 | 20.22 | 50.00 | 21.71 | 32.56 | 53.60 | 73.64 |
| 12 | 16.97 | 20.79 | 50.77 | 22.63 | 33.94 | 54.74 | 75.00 |
| 13 | 17.69 | 21.38 | 51.56 | 23.59 | 35.38 | 55.85 | 76.15 |
| 14 | 18.44 | 22.00 | 52.35 | 24.59 | 36.88 | 56.94 | 77.14 |
| 15 | 19.21 | 22.65 | 53.16 | 25.61 | 38.42 | 58.01 | 78.00 |
| 16 | 20.00 | 23.32 | 53.96 | 26.67 | 40.00 | 59.04 | 78.75 |
| 17 | 20.81 | 24.02 | 54.76 | 27.75 | 41.62 | 60.03 | 79.41 |
| 18 | 21.63 | 24.74 | 55.56 | 28.84 | 43.27 | 60.98 | 80.00 |
| 19 | 22.47 | 25.48 | 56.33 | 29.96 | 44.94 | 61.90 | 80.53 |
| 20 | 23.32 | 26.23 | 57.10 | 31.10 | 46.65 | 62.77 | 81.00 |
| 21 | 24.19 | 27.00 | 57.85 | 32.25 | 48.37 | 63.61 | 81.43 |
| 22 | 25.06 | 27.79 | 58.58 | 33.41 | 50.12 | 64.41 | 81.82 |
| 23 | 25.94 | 28.58 | 59.30 | 34.59 | 51.88 | 65.18 | 82.17 |
| 24 | 26.83 | 29.39 | 60.00 | 35.78 | 53.67 | 65.91 | 82.50 |

TABLE II

| COMMON BRACES | | | | | | | | | | | |
| --- | --- | --- | --- | --- | --- | --- | --- | --- | --- | --- | --- |
| 24 | 27 | 30 | 33 | 36 | 39 | 42 | 45 | 48 | 51 | 54 | 60 |
| 33.94 | 38.18 | 42.43 | 46.67 | 50.91 | 55.15 | 59.40 | 63.64 | 67.88 | 71.12 | 76.37 | 84.85 |

What is claimed is:

1. A framing square and measurement tool for wood frame building construction comprising
    a flat plate having arcuately arranged angle marking indicia corresponding to rise in inches per foot of rafter run,
    an elongated rule pivotally mounted to said plate by means of an anti-friction bearing with a pivot axis perpendicular to said plate at the center of said angle marking indicia, said rule having a cursor cooperating with said indicia and a protractor scale centered on said axis,
    a bubble level on said rule,
    a hinged panel mounted to said plate rotatable through at least 90° about an axis parallel to the plane of said plate and perpendicular to the longitudinal axis of said rule, said panel having a vernier scale thereon placed to cooperate with said protractor scale for measuring fractions of a degree,
    a protractor cursor on said plate cooperating with said protractor scale,
    a stud on said plate,
    a frustro-conical friction element slidably and nonrotationally mounted coaxially with said stud, a ring with a frustro-conical inner surface mounted on said rule coaxial with said stud, a cam operable to force said friction element into said ring to substantially prevent relative rotation therebetween, a thumbscrew arranged to lock said cam in a fixed rotational position, and a spring urging said friction element outwardly from said ring.

2. Apparatus as recited in claim 1 wherein said angle marking indicia correspond to common rafter rise to run ratios and said plate further has arcuately arranged marking indicia concentric therewith and corresponding to hip and valley rafter rise to run ratios.

3. Apparatus as recited in claim 1 wherein said bubble level is transverse to the longitudinal axis of said rule thereby indicating vertical orientation of the rule.

4. Apparatus as recited in claim 1 wherein said protractor scale is in the form of a semi-circle and said angle marking indicia are located around the periphery of said semi-circle.

5. A framing square and measurement tool for wood frame building construction comprising a flat plate having angle marking indicia corresponding to rise in inches per one foot of rafter run, an elongated rule pivotally mounted to said plate with a pivot axis perpendicular to said plate at the center of said angle marking indicia, said rule having a cursor cooperating with said indicia and a protractor scale centered on said axis, a hinged panel mounted to said plate rotatable through at least 90° about an axis parallel to the plane of said plate and perpendicular to the longitudinal axis of raid rule, said panel having a vernier scale thereon placed to cooperate with said protractor scale for measuring fractions of a degree, said vernier scale having the spaces between its indicia measured in degrees slightly different from an integer number greater than one, a mechanism for locking said rule relative to said plate including a stud on said plate, a frustro-conical friction element slidably mounted coaxially with said stud, a ring with a frustro-conical inner surface mounted on said rule coaxial with said stud and a cam operable to force said friction element into said ring to substantially prevent relative rotation therebetween.

6. Apparatus as recited in claim 5 wherein said angle marking indicia correspond to common rafter rise to run ratios and said plate further has second marking indicia corresponding to hip and valley rafter rise to run ratios.

7. Apparatus as recited in claim 5 further including a bubble level transverse to the longitudinal axis on said rule thereby indicating vertical orientation of the rule.

8. Apparatus as recited in claim 5 wherein said protractor scale is in the form of a semi-circle and said angle marking indicia are located around the periphery of said semi-circle.

9. Apparatus as recited in claim 5 further including a thumb screw arrangement to lock said cam in a fixed rotational position.

10. Apparatus as recited in claim 5 where said mechanism for locking said rule further includes a spring urging said friction element outwardly from said ring and wherein said friction element has means for constraining it against rotation relative to said stud.

11. Apparatus as recited in claim 5 wherein said elongated rule is mounted to said plate by means of an anti-friction bearing.

12. Apparatus as recited in claim 11 further including a protractor scale on said rule and a vernier scale on said panel cooperating therewith for measuring fractions of a degree.

13. Apparatus as recited in claim 12 further including a table of rafter length and angle data on one side of said rule.

14. Apparatus as recited in claim 13 wherein said angle marking indicia correspond to common rafter rise to run ratios and said plate further has second marking indicia corresponding to hip and valley rafter rise to run ratios.

15. Apparatus as recited in claim 14 wherein said elongated rule is mounted to said plate by means of an anti-friction bearing.

16. Apparatus as recited in claim 15 further including a table of rafter length and angle data on one side of said rule.

17. A framing square and measurement tool for wood frame building construction comprising a plate having angle marking indicia corresponding to rise in inches per one foot of rafter run, an elongated rule pivotally mounted to said plate with a pivot axis perpendicular to said plate at the center of said angle marking indicia, said rule having a cursor cooperating with said indicia and a protractor scale centered on said axis, a hinged panel mounted to said plate having a vernier scale thereon placed to cooperate with said protractor scale, said vernier scale having the spaces between its indicia measured in degrees slightly different from an integer number greater than one, and a protractor cursor on said plate cooperating with said protractor scale and displaced about 80° from said vernier scale, whereby the angle of said rule relative to said plate may be set to one-tenth of a degree by reference to said protractor cursor and said vernier scale.

* * * * *